United States Patent [19]
Wang

[11] Patent Number: 5,825,650
[45] Date of Patent: Oct. 20, 1998

[54] METHOD FOR DETERMINING STANDARD CYCLE TIME OF A STAGE DYNAMICALLY

[75] Inventor: Tza-Huei Wang, Pa Teh, Taiwan

[73] Assignee: Taiwan Semiconductor Manufacturing Co., Ltd., Hsinchu, Taiwan

[21] Appl. No.: 815,304

[22] Filed: Mar. 11, 1997

[51] Int. Cl.⁶ .................................................. G06F 19/00
[52] U.S. Cl. ................................. 364/468.06; 364/468.28
[58] Field of Search ........................ 364/468.05, 468.06, 364/468.07, 468.08, 578, 488–491; 705/7–9

[56] References Cited

U.S. PATENT DOCUMENTS 5,305,221  4/1994  Atherton ............................. 364/468.02
5,586,021  12/1996  Fargher et al. ..................... 364/468.06

Primary Examiner—Joseph Ruggiero
Attorney, Agent, or Firm—Christensen, O'Connor, Johnson & Kindness PLLC

[57] ABSTRACT

A method is disclosed for generating a model for predicting standard cycle time for a semiconductor process stage. A generic cycle time model is created based on Little's formula and Kingman's equation. Past cycle times as related to equipment utilization is used to generate a regression curve. The regression curve is then used to determine the coefficients of the generic cycle time model. Then, the standard cycle time of a stage for a future upcoming cycle is determined by using the cycle time model.

8 Claims, 2 Drawing Sheets

METHOD FOR DETERMINING STANDARD CYCLE TIME OF A STAGE DYNAMICALLY

FIELD OF THE INVENTION

The present invention relates to semiconductor manufacturing process controls, and more particularly, to a method of dynamically generating a cycle time for a processing stage.

BACKGROUND OF THE INVENTION

In a semiconductor production environment, the throughput of a foundry is typically influenced by various factors and steps during the semiconductor manufacturing process. For example, standard cycle time for a process step, work in process (WIP), loading density of equipment, and processing rate are all factors that influence the throughput of a foundry. The standard cycle time refers to the amount of time required to perform a particular semiconductor manufacturing process step, such as planarization, etching, ion implantation, etc . . .

In order for foundry supervisors to efficiently utilize the foundry, it is important to determine the standard cycle time for a particular process. Currently, supervisors utilize their experience to determine standard cycle time. Alternatively, past average cycle times are used to predict the WIP or the standard cycle time for the next production schedule.

However, product demands and production demands are dependent on the needs of the market. The demand for a particular product, such as DRAMs, varies from time to time. Thus, the supervisors experience and the data of the past always cannot accurately follow the variation of the market or product demands. At present, there is no effective method to determine the standard cycle time for a particular process.

Further, currently calculated standard cycle times, inventory figures and WIP are for a foundry as a whole rather than for each processing stage, respectively. Generally, supervisors only know very rough information about cycle time, the inventory via the cycle time, and inventory for a foundry. There are too many variations that cannot be considered under conventional methods. For example, the arrival rate (processing rate), loading density (equipment utilization), mean time of repair of each stage are different. In order to get better information about the cycle time and the inventory, a method to generate the standard cycle time and the inventory for a stage is necessary.

SUMMARY OF THE INVENTION

A method of predicting a future standard cycle time for a stage in a semiconductor process line is disclosed. The method comprises the steps of: (a) gathering a plurality of prior cycle times (T) for said stage, each of said plurality of prior cycle times having associated therewith an equipment utilization (u); (b) calculating a set of coefficients (a, b) by curve fitting said plurality of prior cycle times with said associated equipment utilization in accordance with $T=a+b[u/(1-u)]$; (c) using said calculated set of coefficients (a, b) in step (b) to generate said model as $T=a+b[u/(1-u)]$; (d) providing a future equipment utilization; and (e) calculating said future standard cycle time using the model in step (c).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

A new method is disclosed herein to generate a standard cycle time of a stage dynamically. The present invention provides a simple mathematical model of calculating cycle time according to an equipment utilization factor, u. Further, the present invention provides characteristic parameters of each stage that indicate the static distribution profile of cycle time for the past. An embodiment of the present invention will now be explained using the accompanying drawings.

Figure 1:
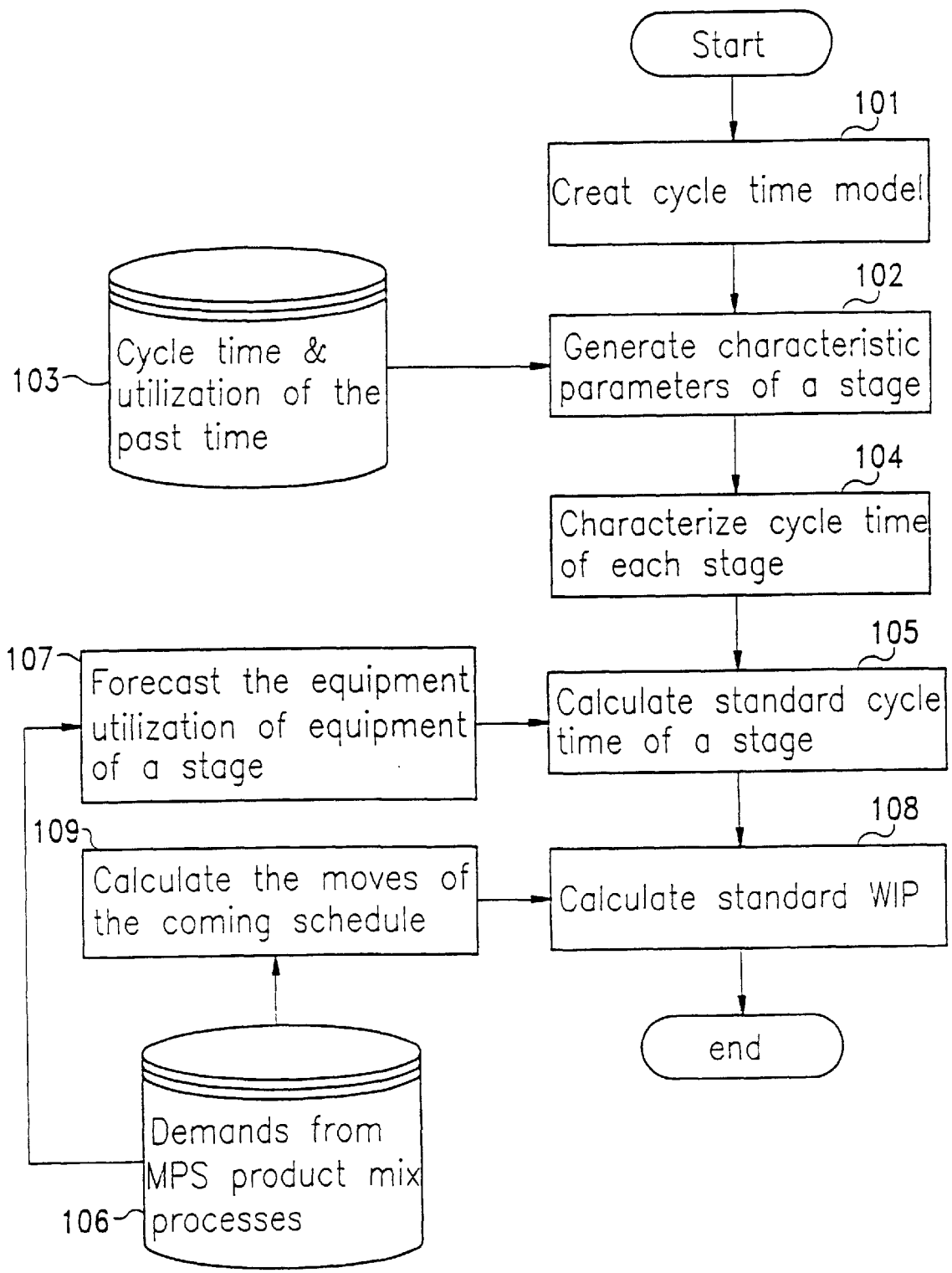
FIG. 1 is a flow chart illustrating the preferred embodiment of the present invention.

Referring to FIG. 1, a flow chart showing a standard cycle time of a stage and a work in process (WIP) of a stage made in an preferred embodiment of the present invention.

First, a cycle time model is created by using Little's formula and Kingman's equation (step 101). These relationships are well known to those of ordinary skill in the art. These two formulas will be described as follows.

Little's formula is:

$$N=\lambda T$$

where N is the average inventory level, $\lambda$ is the arrival rate, and T is the cycle time.

Furthermore, for a single server system with exponentially distributed interarrival and service time, Kingman's equation gives:

$$N=u[1+uV/2(1-u)]$$

where N is the average inventory level, u is the loading density or equipment utilization, and V is the fabrication operation and capacity variability.

The fabrication operation and capacity variability relate to, for example, machine downtime, PM, setup, power glitches, operational hobbits, etc . . . According to the above two equations, it can be derived that:

$$N=\lambda T=u[1+uV/2(1-u)]$$

since processing rate $\lambda$ is proportional to equipment utilization u, cycle time can be modeled as:

$$T=a+b[u/(1-u)]$$

where (a, b) are coefficients related to fabrication operation and capacity variability.

For example, the mean time to repair (MTTR) of a stage, the mean time between failure (MTBF) of a stage play a role in determining the coefficients (a, b). Different process stages can be characterized by different parameters (a ,b). Further, even for the same process stage the parameters (a, b) varies from time to time. The cycle time model derived above indicates that cycle time is proportional to equipment utilization, u. Therefore, cycle time can be predicted if the equipment utilization is known and the coefficients (a, b) are known. Thus, the parameters (a, b) of each process stage must be determined in advance.

The next step of the method is step 102, which generates the characteristic parameters (a, b) by using the fabrication operation and capacity variability of the past. The most important task of the step 102 is to determine the characteristic parameters (a, b) of the process stages for the next production run. In order to accomplish this, cycle times for the process stage during prior past production runs are necessary.

Figure 2:
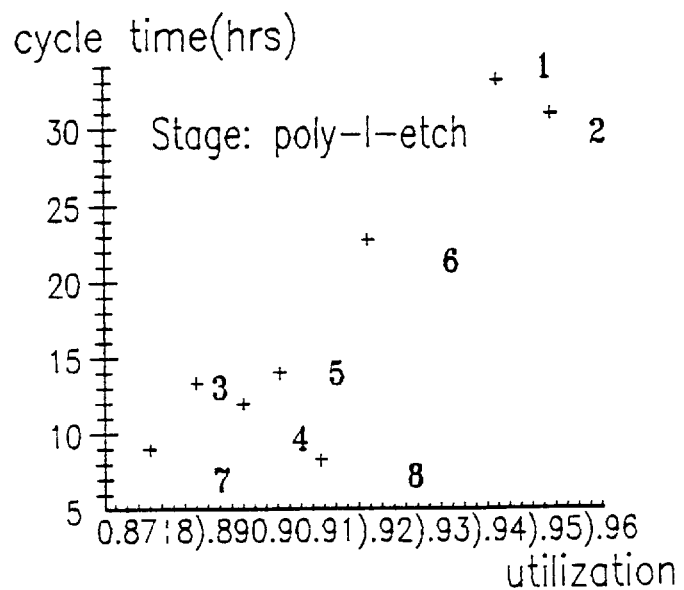
FIG. 2 is a graph that illustrates data points of past cycle times for a stage as a function of equipment utilization.

FIG. 2 illustrates a graph of process cycle time versus equipment utilization, u, for several prior production runs, denoted 1–8. In particular, it can be seen that for data point 1, which represents a prior production run, when equipment utilization was approximately 0.94, the process cycle time was well over 30 hrs. Similarly, it can be seen that for data point 3, which represents another prior production run, when equipment utilization was approximately 0.88, the process cycle time was about 13 hrs. Indeed, the data points used in FIG. 2 are actual data from a foundry owned by the assignee of the present invention. The process stage shown is for a polysilicon etching step for the months of January 1996 to August 1996. The data points generally indicates that cycle time increases as equipment utilization increases. As shown in FIG. 2, the data points are obtained from a database 103 that stores the information from past production runs.

Figure 3:
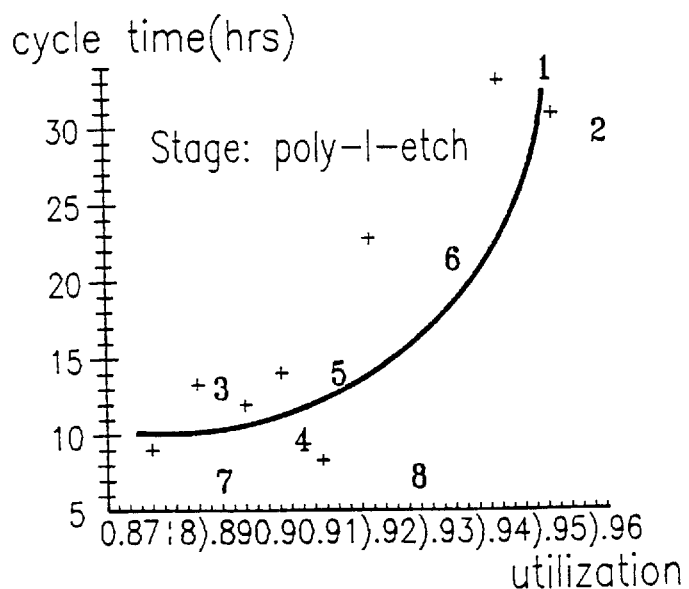
FIG. 3 is a graph that shows a regression curve fitted to the graph of FIG. 2 using a relationship derived in accordance with the present invention.

Next, in step 104, the cycle time of a process stage is characterized by using the well known mathematical technique of static regression. The data used for the regression is provided from the data shown in FIG. 2 and determined in step 102. Using the equation above:

$$T=a+b[u/(1-u)]$$

and the data of FIG. 2, a "curve fitting" regression technique can be used to determine the coefficients (a, b). FIG. 3 shows a curve fitted to the data of FIG. 2 using the equation above.

Once the coefficients (a, b) have been calculated, the cycle time for the stage can be predicted if the anticipated equipment utilization is known. Thus, in step 105, the standard cycle time of a stage of a future production run is determined by using the cycle time model and the characteristic parameters (a, b) according to equipment utilization which could be calculated from the demanded product quality.

The equipment utilization, u, can be determined by having information from a "production control department" of a foundry according to the master production schedule (MPS). As is known to those skilled in the art, the MPS is determined by customer demands. The production control department then can provide an estimate of the equipment utilization using known techniques based upon the MPS at box 107.

Next, at step 105, the standard cycle time of the process stage is calculated by applying the equipment utilization u from step 107 and the coefficients (a, b) that are derived in steps 102 and 104 to the derived equation: $T=a+b[u/(1-u)]$. Further, the standard cycle time may be dynamically tuned while the demands and the characteristic parameters vary over time.

If desired, in step 108, the WIP (standard inventory level) of a stage for a coming month may be dynamically determined by applying the standard cycle time determined in box 105 to Little's formula, i.e.: $N=\lambda T$.

The standard cycle time is derived in step 105. $\lambda$ can be calculated in step 109 according to the demanded quantity of every product of next month based on the different flow paths of various products. To keep the inventory of each stage at an optimum level is very important to prevent WIP from pilling up or starvation.

The description above will allow the prediction of a cycle time for a process step in a foundry line. It can be appreciated that the cycle times for all of the other process stages in a foundry line may be calculated in a similar fashion.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of controlling an inventory of a stage in a semiconductor foundry, said method comprising:

generating a set of characteristic parameters (a, b) by using prior cycle times (T) having associated therewith an equipment utilization (u), wherein said prior cycle times are associated with said associated equipment utilization in accordance with a cycle time model given by $T=a+b[u/(1-u)]$;

characterizing a cycle time of said stage by using said set of characteristic parameters;

determining a demanded product quantity to be manufactured during a future product run according to a master production schedule (MPS); forecasting a future equipment utilization of said future product run by said MPS;

determining said future product run by using said cycle time model and said set of characteristic parameters according to said future equipment utilization calculated from said demanded product quantity;

calculating a future standard cycle time of said stage using said cycle time model by applying said future product run equipment utilization and said characteristic parameters to said cycle time model;

calculating a standard work in process (WIP) of said stage;

using said standard WIP to control said inventory for said stage to keep said inventory in said stage in a predetermined range.

2. The method of claim 1, wherein said standard work in process (WIP) is calculated by multiplying said future standard cycle time by a processing rate.

3. The method of claim 1, wherein said set of characteristic parameters are generated by curve fitting using static regression.

4. A method of controlling an inventory of a stage in a semiconductor process, said method comprising:

generating a set of characteristic parameters (a, b) by using prior cycle times (T) having associated therewith an equipment utilization (u), wherein said prior cycle times are associated with said associated equipment utilization in accordance with a cycle time model given by $T=a+b[u/(1-u)]$;

characterizing a cycle time of said stage by using said set of characteristic parameters;

forecasting a future equipment utilization of a future product run by a master production schedule (MPS);

calculating a future standard cycle time of said stage using said cycle time model by applying said future equipment utilization and said characteristic parameters to said cycle time model; and using said future standard cycle time to control said inventory for said stage in a predetermined range.

5. The method of claim 4, further comprising the following steps to forecast said future equipment utilization:

determining a demanded product quantity to be manufactured during a future product run according to said master production schedule (MPS); and determining said future product run by using said cycle time model, said set of characteristic parameters according to said future equipment utilization calculated from said demanded product quality.

6. The method of claim 4, further comprising calculating a standard work in process (WIP) of said stage after calculating said standard cycle time.

7. The method of claim 6, wherein said standard work in process (WIP) is calculated by multiplying said future standard cycle time by a processing rate.

8. The method of claim 4, wherein said set of characteristic parameters are generated by curve fitting using static regression.

* * * * *